May 4, 1948.                    R. W. LUCE                    2,440,963
                         METHOD OF MAKING MOLDS
                          Filed March 6, 1945
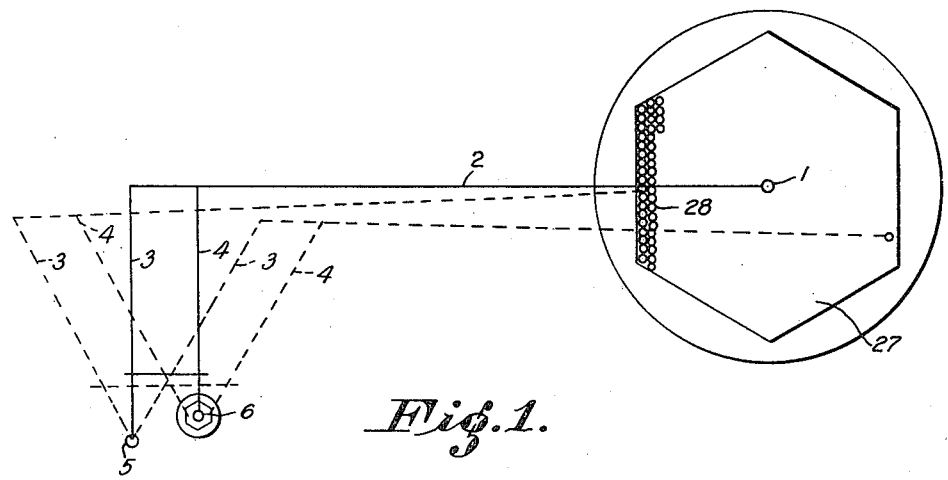
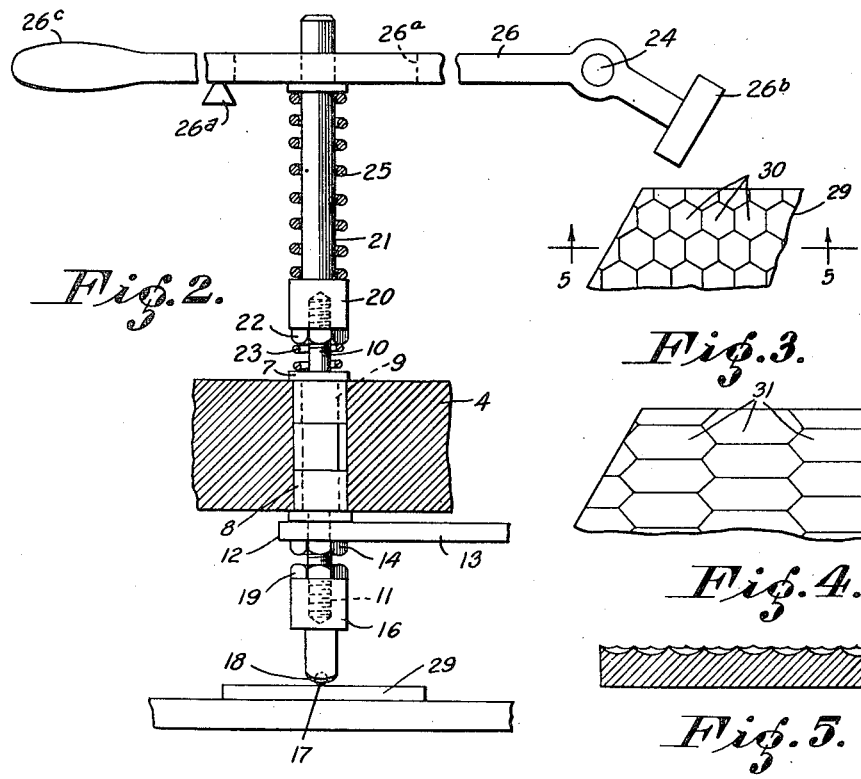
INVENTOR.
RICHARD W. LUCE
BY George F. Gill
ATTORNEY.

Patented May 4, 1948

2,440,963

UNITED STATES PATENT OFFICE 2,440,963

METHOD OF MAKING MOLDS

Richard W. Luce, Southport, Conn.

Application March 6, 1945, Serial No. 581,316

9 Claims. (Cl. 76—107)

The invention herein disclosed relates to the art of molding. More particularly, the invention relates to a method of making a mold that is especially suitable for molding a sheet or plate having on the surface thereof a plurality of relatively small, closely related protuberances, each of which has a surface of a smoothness or polish requisite for an optical surface.

Plates or sheets having on the surface thereof relatively small, in the nature of one thirty-second of an inch or less, accurately formed, closely related, and uniformly distributed protuberances having a surface comparable to the ground and polished surfaces of lenses, commonly termed optical surfaces, have many and various uses in the practical arts. Such a sheet or plate is, for example, especially useful as a light-collecting and distributing medium for a retrodirective light-reflecting sign; it is especially effective as a reflecting screen for moving pictures and television; it has application in photography, and many places involving the collection, distribution or reflection of light. In such uses as those mentioned, where the light emanating from the plate, either directly or by reflection, is to be observed by the human eye, the protuberances or lens formations must be of such size and so closely related that within the distance of observation, the angle of acuity is such that light emanating from each lens or protuberance is not individually resolved. In addition, the relation of the protuberances is desirably such that there is no observable distortion in the image outlined in or by the plate. These requirements, for the applications mentioned, and many others of like requirement, necessitate that the protuberances be of less than one thirty-second of an inch in diameter at the perimeter and that the perimeter of adjacent lenses be in contact. Heretofore and prior to the invention herein disclosed, it has been considered practically impossible to produce a mold from which such sheets or plates could be formed.

An object of this invention is to produce a mold or die that is suitable for forming moldable materials with protuberances on the surface thereof which protuberances are closely related and which have a surface of the requisite smoothness or polish of an optical surface. Another object of the invention is to provide a method for making a mold or die having these characteristics.

The invention may be best described by and understood from a description of its application in a mold embodying the invention and the specific method, comprehended within the invention, by which the mold is made. Such a description is given below with reference to the accompanying drawing in which a mold and apparatus for carrying out the method are disclosed.

The drawings include:

Fig. 1 which is a diagrammatic plan of a pantograph that may be used in making a mold in accordance with the method of this invention;

Fig. 2 which is a fragmentary elevation of the stylus of the pantograph;

Fig. 3 which is a partial plan, on enlarged scale, of a mold embodying the invention;

Fig. 4 which is a partial plan of a modified mold embodying this invention; and

Fig. 5 which is a transverse section of the mold shown in Fig. 3 taken on the line 5—5 of Fig. 3.

To provide a mold or die of the kind to which this invention relates, extreme accuracy in equipment and manipulation is required in addition to the hobbing or impressing implement which must have the desired smoothness and polish that is required for an optical surface. The ultimate is to provide a mold from which there may be cast an optical surface that is totally, optically effective and when acting as a collecting, distributing or light reflecting medium effects the collecting or focusing of light, the distribution or reflection of light in such manner that there are no observable distortions in characteristics of the medium, image or subject represented or visually reproduced in the focused, distributed or reflected light. Where the molded article as here employed for the control of light in the manner stated, is made up of a plurality of lenses, closely related and homogeneously distributed, the lenses must be of such size and so closely related that they or the luminous effect produced by each lens cannot at the normal distance of observation be individually resolved by the normal human eye. In addition, each minute lens must be accurately formed, in respect to its optical functions, and have a surface of such smoothness and polish as is commonly required for what is generally termed an optical surface.

Experience has shown that for the purposes or applications mentioned, the plate or sheet required must have the surface thereof substantially completely covered with minute lenses having a radius of curvature of one sixty-fourth of an inch or less. That is to say, there should be at least one thousand, optically accurate lenses in each square inch of the surface. Television screens are contemplated, for normal consumption, of eighteen by twenty-four inches, or over four hundred square inches. Such a screen, constructed from a mold of this invention, requires a mold having well over five hundred thousand optically accurate and surfaced protuberances. Preferably, the diameter of each protuberances is less than ten-thousandths (0.010) of an inch and desirably, as experiments have demonstrated, of something in the order of five thousandths (0.005) of an inch at the surface of the screen, somewhat in the nature of a good halftone print.

Molds for this purpose and with the requisite accuracy of depressions in size, spacing and character of surface, embodying the invention are made in accordance with the method of the invention by impressing into the surface of a metal plate an implement or element having the desired curvature and surface characteristics, for each cavity required. The implement must, of course, be of sufficient hardness and toughness to withstand, without substantial distortion, the force required to force it into a metal plate in such manner as to leave a complementary impression in the plate. For this purpose, and for the purpose of providing substantially spherical lens cavities, a steel ball has been used. A steel ball of the kind commonly marketed for ball bearings has been found satisfactory for the purpose.

For most of the applications mentioned for a molded plate having relatively small lenses on the surface thereof, the lenses are preferably substantially spherical and constitute sectors of a sphere of ninety degrees or less. In addition, adjacent lenses should be in contact so that the entire surface of the plate is covered with lenses. This requires, in the making of the mold, an accurate positioning of the ball on successive positions on the metal plate and uniform pressure to effect like depths of impressions and controlled flow of the metal at the impressions.

In order to meet these requirements where the lens cavities are ninety degree sectors of a sphere of one-thirty-second of an inch in diameter or less, it has been found desirable to utilize mechanism for the purpose of accurately positioning the ball, retracing the numerous positions, and applying a controlled pressure at each located position. The simplest mechanism for this purpose seems to be a pantograph. Such an arrangement, is shown in the drawings and has been used in the making of such molds.

The pantograph illustrated diagrammatically in Fig. 1 includes a tracing head 1, fixed on one end of an arm 2. Parallel arms 3 and 4 are pivotally secured at corresponding ends thereof to the arm 2, spaced from the tracing head 1 in accordance with the proportional reduction desired. The opposite end of the arm 3 is pivotally secured to a fixed pivot 5, and the corresponding end of the arm 4, carries a working head 6. Intermediate the ends of the arms, a link extends between the arms 3 and 4, parallel to the arm 2 and is pivotally secured to the arms 3 and 4. This is a well known form of pantograph suitable for reducing, proportionally, the scale of a design.

The arm 4 (Fig. 2) is bored transversely for mounting the working head. In spaced bushings 7 and 8 within the bore a stylus rod 9 is slidably mounted for longitudinal movement transverse to the arm 4. Upper and lower reduced portions 10 and 11 of the stylus rod extend beyond the arm 4, and are threaded. The lower portion has opposite flat surfaces thereon that extend between the forked end 12 of a guide bar 13 which prevents the stylus rod 9 from turning about its axis. A guide nut 14, held in position by a check nut 15 engages the under side of the guide bar in the upper position of the stylus rod and serves to limit the upward movement of the stylus rod. To the lower end of the reduced portion 11, there is secured a ball holder 16 having an end portion recessed to receive a ball 17 which is held in place by a sheet metal cap 18 frictionally engaging the end portion of the ball holder. A check nut 19 firmly fixes the ball holder on the end of the stylus rod.

The upper end portion 10 of the stylus rod is threaded into a bracket 20 formed on the end of a rod 21. A check nut 22 threaded on the portion 10 engages the lower surface of the bracket. A spring 23 acting between the end of the bushing 7 and the check nut 22 acts to raise the stylus rod to a position in which the guide nut 14 engages the guide bar.

Suitably mounted on a pivot 24, there is an operating lever 26. This lever has a slot 26a therein which receives the end of the rod 21 to engage the end of a spring 25 surrounding the rod and resting upon the bracket 20. A counterweight 26b normally maintains the operating lever 26 raised and out of contact with the spring 25. The operating lever is provided with a handle 26c by means of which it may be brought, manually, to the horizontal position shown against a fixed stop 26d. In this way, the spring 25 is compressed a definite amount and produces a definite pressure on the stylus rod to overcome the force of the spring 23 and press the ball 17 into a metal plate.

In using the pantograph for making a mold in accordance with this invention, the desired spacing of the cavities is laid out on a metal pattern plate 27 on enlarged scale, desirably ten times larger. Holes 28 are drilled in the plate in accordance with the pattern or the spacing, on enlarged scale, from center to center. Preferably, the holes are laid out on right angular coordinates, i. e., along the intersection of equally spaced horizontal and vertical lines. The tracing head 1 carries a stylus pin which fits, accurately, the drilled holes. A metal block 29, preferably annealed steel, is placed beneath the working head, such that the surface thereof is closely adjacent the ball 17 when the stylus rod is in its retracted position. The plate 27 and block 29 are firmly fixed in position.

The operator moves the stylus pin of the tracing head to the first opening in the first line of openings in the pattern plate 27 and inserts the pin in the opening. He then moves the operating lever 26 a definite amount, against a set, fixed stop, to compress the spring 25 a definite amount and so exert a definite pressure or force on the ball 17, sufficient to impress the ball into the surface of the block a definite amount. This operation is repeated for every opening in the pattern plate. Preferably, the operator proceeds from opening to opening along each line successively. The pantograph should be so constructed that there isn't any backlash. With such a pantograph the pattern can be retraced and the ball will be accurately repositioned on the block for each cavity. It is necessary to retrace the pattern because in the first instance the sinking of a cavity disturbs the metal in the adjacent previously sunk cavity. On the first impressions made the metal is made to flow to produce the cavities and on the second and subsequent retracing of the pattern, irregularities in the formed cavities are corrected.

Properly actuated and with the proper spacing of openings in the pattern plate, molds such as illustrated in Figs. 3 to 5 are readily constructed with each cavity having a surface comparable to the polished surface of the ball. Balls of one thirty-second of an inch in diameter and smaller have been successfully used in making such molds. Commonly, for making an optical plate such as described, the ball is sunk into the metal plate a distance to form a cavity constituting a ninety degree sector of a sphere, and molds with such cavities spaced apart five thousandths (0.005) of an inch and covering the entire surface of the molding area have been made.

Such a mold is illustrated in Figs. 3 and 5. This mold consists of a metal block 29 having spherical cavities 30 covering the entire molding surface thereof. The perimeters of the cavities are in the form of hexagons so that adjacent cavities are in contact and nest together thus covering the entire surface of the block. This arrangement is effected by spacing the openings of alternate rows in the pattern plate intermediate the centers of adjacent rows.

For certain optical purposes, such as home moving picture screens and television screens, it is desirable that the protuberances be elongated in the horizontal direction and foreshortened in the vertical direction. This is to provide a light field of greater horizontal than vertical spread. A mold for such a screen is illustrated in Fig. 4 with the cavities on greatly enlarged scale. In making this mold, the holes in the pattern plate are spaced a greater distance in one direction or right angle coordinate than in the other. The result is elongated hexagonal cavities 31 covering the entire molding surface of the block. Molds of the kind mentioned are feasible with cavities of sixteen thousandths (0.016) of an inch in diameter at the surface and spaced five thousandths (0.005) from center to center.

For certain purposes, a mold of reasonable size may be produced in the manner described and electrolytically reproduced to form a larger mold. When this is done, it is desirable that the original mold be, in outline, in the form of a hexagon so that the reproduced molds may be nested and continuous lines will not appear in the molded sheet.

From the foregoing description of the method of this invention and the mold comprehended within the invention, it will be seen that by the invention there is produced an extremely accurate mold having minute cavities over the entire molding area, each with a surface requisite to mold an optical surface.

It will be obvious that various changes may be made by those skilled in the art in the details of the molds disclosed in the drawings and the steps of the method described above within the principle and scope of the invention as expressed in the appended claims.

I claim:

1. The method of making a mold having a plurality of closely related, uniformly distributed, substantially spherical lens cavities therein with surfaces of the requisite smoothness for molding an optical surface, which method includes the steps of locating on a metal plate a ball having the requisite characteristics to withstand material distortion under the force required to sink the ball in the metal plate, exerting a force on the ball sufficient to impress the ball into the metal plate a distance less than the diameter of the ball, again locating the ball on the plate separated from the cavity so formed a distance less than the diameter of the ball and such as to provide at least one thousand cavities per square inch of surface of the plate, again applying a force sufficient to impress the ball in the plate a distance substantially equal to the first cavity formed in the plate and repeating the operation to provide a multiplicity of like cavities in the surface of the plate.

2. The method of making a mold having a plurality of closely related, uniformly distributed, substantially spherical lens cavities therein with surfaces of the requisite smoothness for molding an optical surface, which method includes the steps of locating on a metal plate a ball having the requisite characteristics to withstand material distortion under the force required to sink the ball in the metal plate, exerting a force on the ball sufficient to impress the ball into the metal plate a distance less than the diameter of the ball, again locating the ball on the plate separated from the cavity so formed a distance such that a like cavity will be in contact with the previous cavity, again applying a force sufficient to impress the ball in the plate a distance substantially equal to the previous cavity formed in the plate, and repeating the operation to provide a multiplicity of like cavities uniformly distributed in the surface of the plate.

3. The method of making a mold having a plurality of closely related, uniformly distributed, substantially spherical lens cavities therein with surfaces of the requisite smoothness for molding an optical surface, which method includes the steps of locating on a metal plate a ball having the requisite characteristics to withstand material distortion under the force required to sink the ball in the metal plate, exerting a force on the ball sufficient to impress the ball into the metal plate a distance less than the diameter of the ball, again locating the ball on the plate separated from the cavity so formed a distance such that a like cavity will be in contact with the previous cavity, and again applying a force sufficient to impress the ball in the plate a distance substantially equal to the previous cavity formed in the plate, and repeating the locating and pressure on the ball to produce a plurality of cavities with adjacent cavities in right angular coordinates in contact.

4. The method of making a mold having lens cavities of less than one thirty-second of an inch uniformly distributed over the surface thereof and with adjacent lens cavities substantially in contact which method includes the steps of locating on a metal plate a ball of such diameter as upon impression in the plate to produce a substantially spherical depression of less than one thirty-second of an inch, applying to the ball a force sufficient to impress the ball into the metal plate to a depth to form a depression of less than one thirty-second of an inch at the surface of the plate, again locating the ball on the plate separated from the cavity so formed a distance such that when impressed in the plate to the same depth will form a cavity substantially in contact with the previous cavity formed in the plate, again applying a force on the ball sufficient to impress the ball in the plate a distance substantially equal to the depth of the previously formed cavity and repeating the operation to provide a multiplicity of like cavities in the surface of the plate.

5. The method of making a mold having lens cavities of less than one thirty-second of an inch in diameter uniformly distributed over the surface thereof and with adjacent lens cavities substantially in contact which method includes the steps of laying out a pattern of the lens cavity formation, locating a ball on a metal plate in one of the positions corresponding to the pattern, applying a force to the ball sufficient to impress the ball in the plate a distance less than the diameter of the ball, again locating the ball on the plate in accordance with the next succeeding position determined by the pattern, impressing the ball in the plate, and repeating the operation for each position represented on the pattern.

6. The method of making a mold having lens cavities of less than one thirty-second of an inch in diameter at the surface of the mold and uniformly distributed over the surface of the mold with adjacent lenses substantially in contact which method includes the steps of laying out a pattern of lens cavity positions on right angular coordinates, locating a ball on a metal plate in one of the positions corresponding to the pattern, applying a force to the ball sufficient to impress the ball in the plate a distance less than the diameter of the ball, again locating the ball on the plate in accordance with the next succeeding position determined by the pattern, impressing the ball in the plate, and repeating the operation for each position represented on the pattern.

7. The method of making a mold having at least one thousand, substantially spherical lens cavities distributed over each square inch of the surface thereof, each cavity having a surface of the requisite smoothness for molding an optical surface, which method includes the steps of locating on a metal plate an implement having a curvature complementary to the desired cavity, applying a force to the implement sufficient to sink the implement into the metal plate, moving the implement successively to the numerous positions, and at each position applying a force of the same magnitude to the implement.

8. The method of making a mold having a plurality of closely related, uniformly distributed, substantially spherical lens cavities therein with surfaces of the requisite smoothness for molding an optical surface, which method includes the steps of locating on a metal plate a substantially spherical implement having the requisite characteristics to withstand material distortion under the force required to sink the implement in the metal plate, exerting a force on the implement sufficient to impress the spherical end into the metal plate a distance substantially less than the diameter of the sphere, again applying a force sufficient to impress the implement in the plate a distance substantially equal to the first cavity formed in the plate, continuing the operation until an area of the plate is covered with substantially contacting cavities, and repeating the procedure to deepen the cavities.

9. The method of making a mold having at least one thousand, substantially spherical lens cavities distributed over each square inch of the surface thereof, each cavity having a surface of the requisite smoothness for molding an optical surface, which method includes the steps of locating on a metal plate an implement having a curvature complementary to the desired cavity, applying a force to the implement sufficient to sink the implement into the metal plate, moving the implement successively to the positions, at each position applying a force of the same magnitude to the implement, and repeating the operation over a particular area to deepen the cavities.

RICHARD W. LUCE.

REFERENCES CITED

The following references are of record in the file of this patent:

UNITED STATES PATENTS

| Number | Name | Date |
|---|---|---|
| 206,596 | McKee | July 30, 1878 |
| 356,757 | Fountain | Feb. 1, 1887 |
| 991,747 | Rawsthorne | May 9, 1911 |
| 1,784,866 | Fahrenwald | Dec. 16, 1930 |
| 1,982,209 | Gary | Nov. 27, 1934 |
| 2,014,698 | Reilly | Sept. 17, 1935 |
| 2,203,200 | Komarek | June 4, 1940 |
| 2,315,721 | Martin | Apr. 6, 1943 |
| 2,332,360 | Wakefield | Oct. 19, 1943 |
| 2,373,871 | Connor, et al. | Apr. 17, 1945 |
| 2,386,296 | De Fazi | Oct. 9, 1945 |